United States Patent [19]

Golem et al.

[11] Patent Number: 5,367,578
[45] Date of Patent: Nov. 22, 1994

[54] SYSTEM AND METHOD FOR OPTICAL RECOGNITION OF BAR-CODED CHARACTERS USING TEMPLATE MATCHING

[75] Inventors: Dennis W. Golem; Meera Kulkarni, both of Waterloo; Raymond L. Higgins, Kitchener, all of Canada

[73] Assignee: NCR Corporation, Dayton, Ohio

[21] Appl. No.: 761,661

[22] Filed: Sep. 18, 1991

[51] Int. Cl.⁵ .......................... G06K 9/18; G06K 9/62
[52] U.S. Cl. ........................... 382/12; 382/30; 382/34; 382/48
[58] Field of Search ............. 382/12, 11, 30, 34, 382/52, 48, 38, 46; 235/462

[56] References Cited

U.S. PATENT DOCUMENTS

| | | | |
|---|---|---|---|
| 3,629,833 | 12/1971 | Demer | 382/56 |
| 3,688,955 | 9/1972 | L'Huillier | 382/12 |
| 4,168,488 | 9/1979 | Evans | 382/46 |
| 4,408,342 | 10/1983 | Grabowski et al. | 382/34 |
| 4,468,809 | 8/1984 | Grabowski et al. | 382/34 |
| 4,556,985 | 12/1985 | Hongo | 382/30 |
| 4,822,986 | 4/1989 | Guthmueller et al. | 235/462 |
| 4,873,426 | 10/1989 | Sarna et al. | 235/462 |
| 4,903,316 | 2/1990 | Hongo et al. | 382/52 |
| 4,959,870 | 9/1990 | Tachikawa | 382/18 |
| 5,020,117 | 5/1991 | Ooi et al. | 382/34 |
| 5,033,101 | 7/1991 | Sood | 382/38 |
| 5,052,044 | 9/1991 | Gaborski | 382/12 |
| 5,077,805 | 12/1991 | Tan | 382/30 |

*Primary Examiner*—Leo H. Boudreau
*Assistant Examiner*—Larry J. Prikockis
*Attorney, Agent, or Firm*—Robert S. Hulse; Elmer Wargo

[57] ABSTRACT

A system and method are disclosed for optical scanning and recognition of bar-coded characters such as CMC7 type fonts having a pattern of bars and intervals recorded on documents such as bank drafts and checks. The system includes an imaging device for forming a digitized matrix having rows and columns of a character to be recognized. A processor and an associated program are used for rotating the digitized image to facilitate processing in a word size used by the processor. A memory is used for storing templates of the characters to be recognized to enable the processor to perform template matching. The apparatus and method also include first, second, and third bit configurations used in identifying a character.

26 Claims, 7 Drawing Sheets

SYSTEM AND METHOD FOR OPTICAL RECOGNITION OF BAR-CODED CHARACTERS USING TEMPLATE MATCHING

RELATED APPLICATION

This application is related to patent application Ser. No. 07/635,899, filed Dec. 28, 1990, U.S. Pat. No. 5,091,968, issued Feb. 25, 1992, entitled "Optical Character Recognition System and Method".

BACKGROUND OF THE INVENTION

This invention relates to scanning of documents and the recognition of alphanumeric symbols generally, and particularly to optical scanning and recognition of CMC7 type bar-coded characters using template matching.

The CMC7 character set, which was developed by the French Company Compagnie des Machines Bull, has received widespread use in financial transactions in many countries, primarily in Europe. Generally, the characters are recorded on documents such as bank drafts and checks in MICR (magnetic ink character record) form for scanning by magnetic scanner. Each character has a predetermined height and width and a predetermined pattern of bars and intervals of different opacities (e.g., seven bars and six intervals between the bars, four of the intervals having a short (narrow) width and two of the intervals having a long (wide) width).

A prior system and method for scanning and optically recognizing such characters are disclosed in patent application Ser. No. 07/696,987, filed Dec. 18, 1990, entitled "System and Method for Optical Recognition of Bar-Coded Characters", incorporated by reference herein. However, when the print quality of the bar code is poor, or the character pattern is corrupted by pen strokes or other noise, the optical character recognition method employed by this prior system (which provides for the segmentation and comparison of a character) sometimes does not adequately provide for character recognition.

What is needed and would be useful is a system which would provide for better recognition of such bar-coded characters when problems such as poor print quality, irregular bar spacing or other corruptions of the character's pattern are present.

SUMMARY OF THE INVENTION

A system and method are provided for optical character recognition of bar-coded characters using character shape (template pattern) information. The system provides for improved recognition of bar-coded characters when print quality is poor and portions of the character are obscured or otherwise corrupted with extraneous marks.

In a first aspect of the invention, a system is provided comprising: (a) a CCD scanner for optically scanning (inputting and storing) a bar-coded character having a predetermined pattern of bars and intervals of different opacities on a document, the character and document having different opacities, and producing a plurality of grey-scale pixel values corresponding to said opacities, the gray scale values representing a pattern of light and dark pixels, (b) a memory disposed for storing the grey-scale pixel values, a program, and a plurality of predetermined template binary patterns, one of said patterns representing the character, and (c) a processor coupled to the scanner and to the memory, and operating under control of the program, for locating the character on the document by selecting from said grey-scale pixel values a matrix of values representative of the character, for converting the matrix values to binary data, for compressing the binary data, and for selecting from the plurality of predetermined template binary patterns a pattern that matches the compressed binary data, the matching pattern serving to identify the character.

The CCD scanner includes a control logic, the processor includes a microprocessor, and the memory includes a ROM (read only memory) with a boot routine and a RAM (random access memory) with the program, the pixel values, and the binary patterns.

In a second aspect of the invention, a method is provided for optically identifying a bar-coded character on a document, the character having a predetermined pattern of bars and intervals of different opacities, the character being represented by one of a plurality of predetermined template binary patterns, the method comprising the steps of: (a) optically scanning the character on the document and producing a plurality of grey-scale pixel values corresponding to said opacities, (b) locating the character by selecting, from said grey-scale pixel values, a matrix of values representative of the character, (c) converting the matrix values to binary data, (d) compressing the binary data, and (e) selecting from the plurality of predetermined template binary patterns a pattern that matches the converted binary data, the matching pattern identifying the character. The characters are recorded on the document in, for example, CMC7 format. The camera (CCD scanner) scans the document vertically, from bottom to top, starting at the bottom right corner of the document. The document is moved to the right continuously (with the width of each vertical scan corresponding to the diameter of one pixel) until the top left corner of the document is reached indicating that scanning has been completed.

In locating a character (i.e., the grey-scale pixel values representing the character) for processing, the system positions a window over selected pixel values of the character (thereby framing the character) such that the sum of the selected pixel values within the window is a maximum. In positioning the window, the system identifies character edge and inter-character-space using at least three columns of character data. The system then calculates a threshold level from the selected pixel values, and converts the selected pixel values to binary data relative to the threshold level. The binary data is then compressed to a smaller matrix (array) size and logically compared to each of the predetermined template binary patterns until a matching pattern is found which best identifies the character. Each template (binary pattern) has three-bit configurations (levels), a first bit configuration representing the actual bit pattern of the character, a second bit configuration representing the significance of the bits of the actual bit pattern, and a third bit configuration representing weighted values for the bits of the actual bit pattern. The extent to which the converted binary data logically compares to each of the three bit configurations of each of the predetermined bit patterns is expressed as mismatch words, from which mismatch counts are calculated. The mismatch counts are then compared to at least one predetermined threshold value, and the lowest mismatch count that is below (less than) the threshold value is selected as representative of the character.

DESCRIPTION OF THE PREFERRED EMBODIMENT

A description of the system of the present invention is presented below. The system provides for improved recognition of bar-coded characters when print quality is poor and/or portions (bars/intervals) of a character may be corrupted with extraneous marks. The system uses character shape (template pattern) information in recognizing (identifying) bar-coded characters.

Intra-character bar spacing information has been previously used in recognizing bar-coded characters (refer to patent application Ser. No. 07/636,987 for a description of a bar-code recognition method), and character shape or template pattern information has been previously used in recognizing non-bar-coded characters (refer to U.S. Pat. No. 5,091,968, and see below, for a description of a template-matching method). The system of the present invention extends the use of template pattern information (template matching method) to the recognition of bar-coded characters. In one application of the template matching method (routine), a CMC7 bar-coded document is read using the bar-code recognition method. When this method fails to recognize a bar-coded character, due to poor print quality or extraneous noise, then the template matching method is called on to assist in the classification of the character. After the template matching method completes classification of the character, the bar code recognition method continues with processing the rest of the document, and to call on the template matching method as required.

Figure 1:
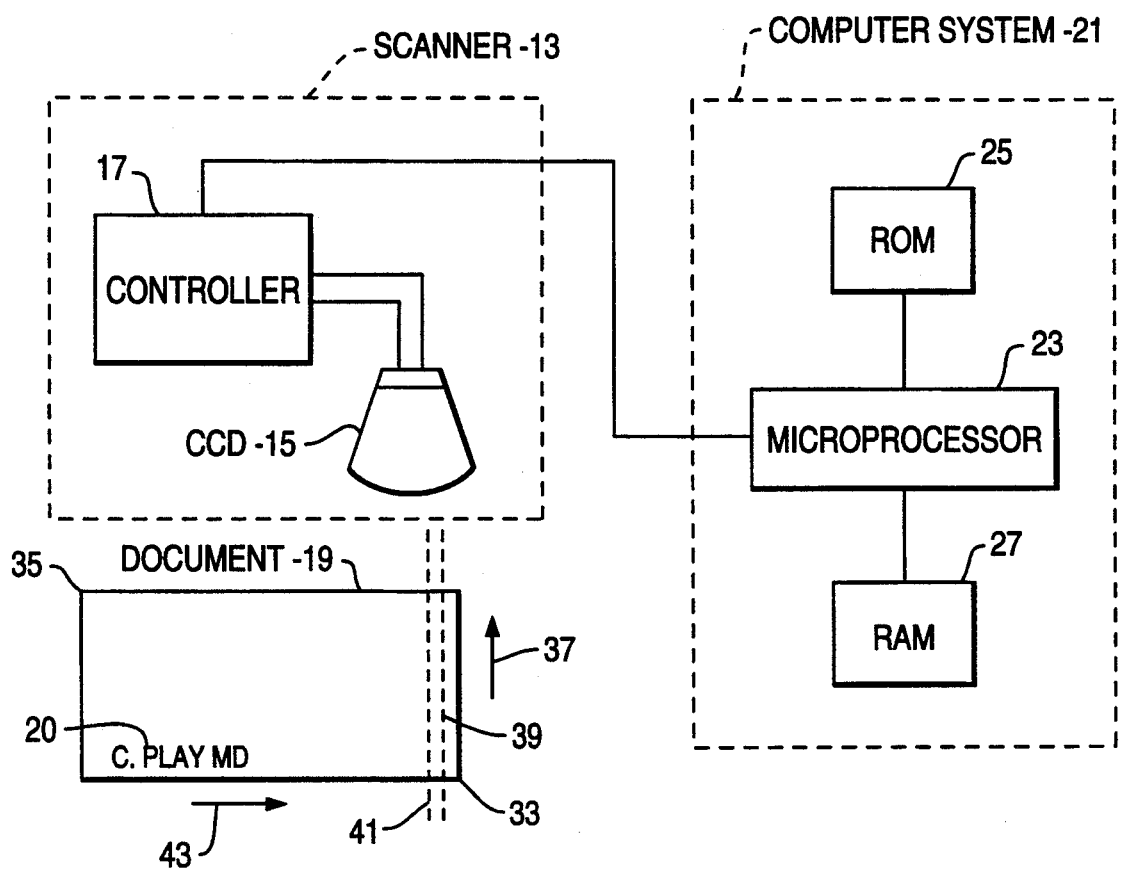
FIG. 1 is a block diagram of the system of the present invention.

FIG. 1 shows a system 11 of the present invention. The system includes an optical camera or scanner 13 for scanning a document 19, and a computer system 21 for processing data received from the scanner 13. The scanner may be a camera with a CCD (charge coupled device) 15 and controller 17. The document 19 may be a bank draft or check with numeric or other bar-coded character 20 recorded thereon. The computer system 21 comprises a microprocessor 23, a ROM (read only memory) 25 with a boot program, a RAM (random access memory with a stored program) 27 for storing data from the scanner and microprocessor, and for storing predefined template patterns (i.e., patterns of binary data representing selected characters).

The scanning operation is commenced at the bottom right corner 33 of the document and ends at the top left corner 35. The scanner 13 scans (reads) the document 19 vertically, from bottom-to-top, as shown by arrow 37, first along right-most virtual scan line 39, then again from bottom-to-top along next-rightmost virtual scan line 41, and so on until the top left corner of the document is reached. The scan lines are arranged in parallel. The document 19 is moved continuously from left to right, as shown by arrow 43, while the scanner scans along successive scan lines, the width of each scan line corresponding to the diameter of a pixel (approximately 0.0127 cm or 0.005 inch). Successive characters are read (inputted and stored) from the document in this manner.

Figure 2:
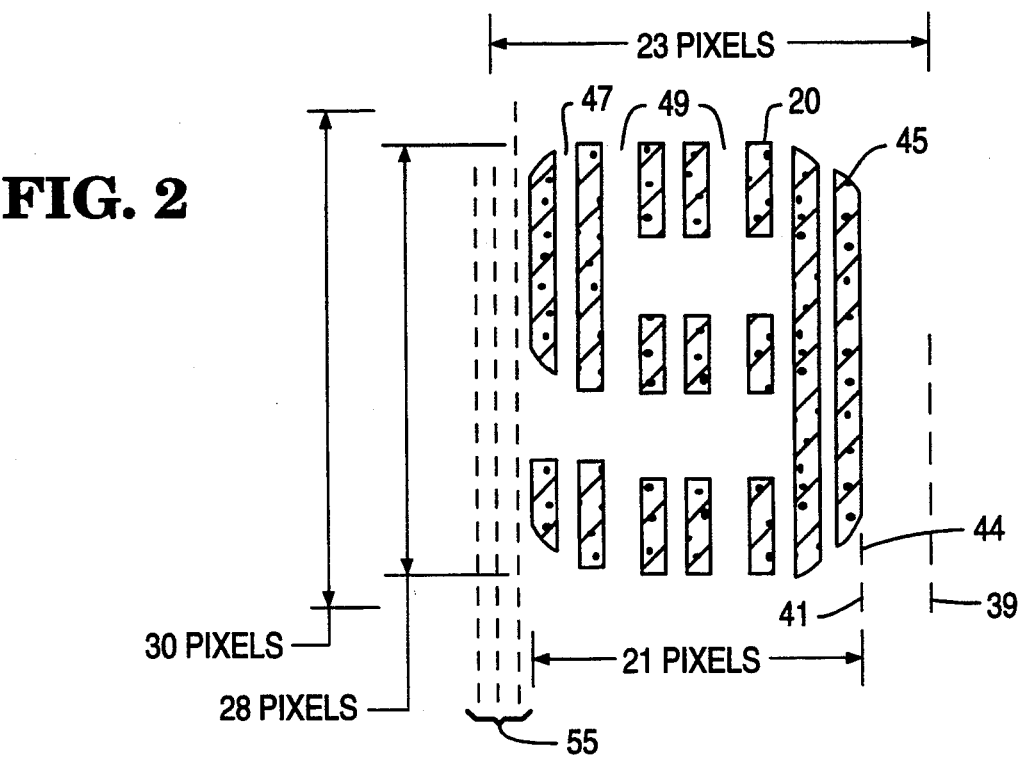
FIG. 2 is a graphic illustration of a bar-coded character readable (scanable and identifiable) by the system of FIG. 1.

For a character 21 pixels wide by 28 pixels high, as shown in FIG. 2, the system treats the character as if it was bounded in an area 23 pixels wide by 30 pixels high, i.e., as having a one-pixel wide white border at each of the top and bottom of the character and at each side of the character. The character images recorded on the document may be non-magnetic or magnetic.

As shown in FIG. 2, each character 20 is uniquely defined by seven parallel vertical bars (data bars) 45, four short intervals 47, and two long intervals 49 between the bars. The scanning direction 37 (FIG. 1) coincides with the direction of the parallel bars. Each bar may be from 0.010 to 0.019 cm. wide, each short interval may be from 0.011 to 0.019 cm. wide, and each long interval may be from 0.031 to 0.039 cm. wide.

The scanning, and processing (segmentation and recognition) of the characters are described in terms of the shape of the character, including the vertical bars and intervals which make up the character. Although the heights of the individual bars may vary, the widths of the bars and intervals are kept (printed) within a predetermined range. The widths of the bars and intervals for one character are the same as the widths of the bars and intervals for other characters of the same set.

Figure 3:
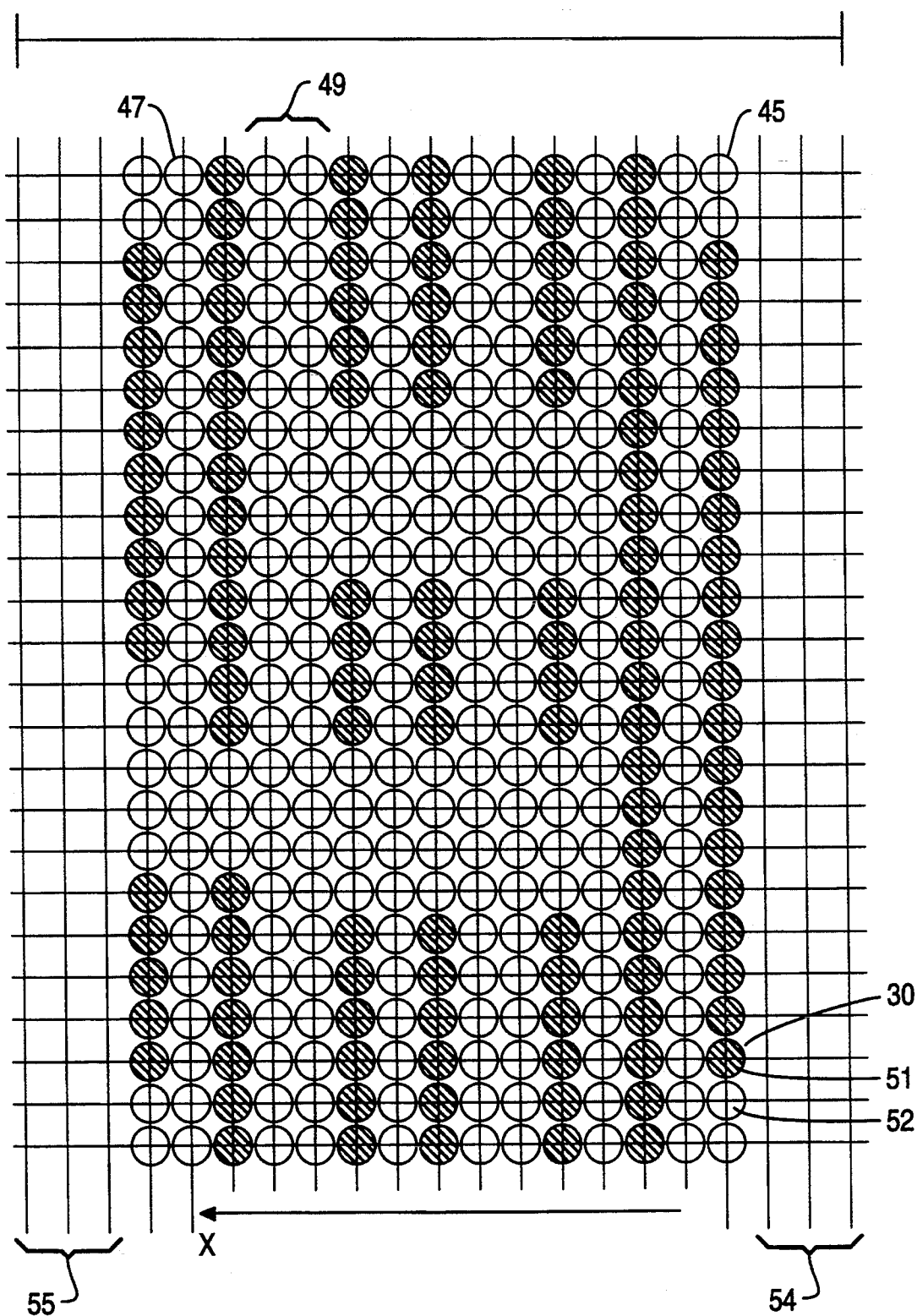
FIG. 3 is a graphic illustration of a scanned bar-coded character having a matrix of pixels of different opacities (grey-scale values)

When a character is scanned, the pixel values generated by the scanner to represent the various bars and intervals of the character are stored in memory 27 (FIG. 1) as a data array (matrix) having, for example, 28 rows (i.e., 28 pixels corresponding to the character's height) and 21 columns (21 pixels corresponding to the character's width). Excluding the pixels which represent the spaces between successive characters and the spaces above and below the characters (i.e., spaces representing the background of the document), the bars and intervals of the character (e.g., the character "nine") may be represented in array form as depicted in FIG. 3. Each dark pixel 51 represents a portion of a vertical bar 45 and has an opacity index or gray-scale value in the range of 0–255. Each light pixel 52 represents a portion of an interval 47, 49, or a portion of an inter-character space 54, and has an opacity/gray-scale value of 0–255. The dark pixels generally have a greater gray-scale value (approaching 255), and the light pixels generally have a lesser gray-scale value (approaching 0).

As indicated above, these gray-scale data values are generated by the scanner upon scanning a document. The generated data are then stored in memory 27 (FIG.

1) for processing by the system. The method employed by the system in processing bar-coded character data is described following under the heading "Processing of Bar-Coded Characters". However, to enable the reader to better understand the processing method, the processing of non-bar-coded character data is described first.

Processing of Non-Bar-Coded Character Data

Figure 4A:
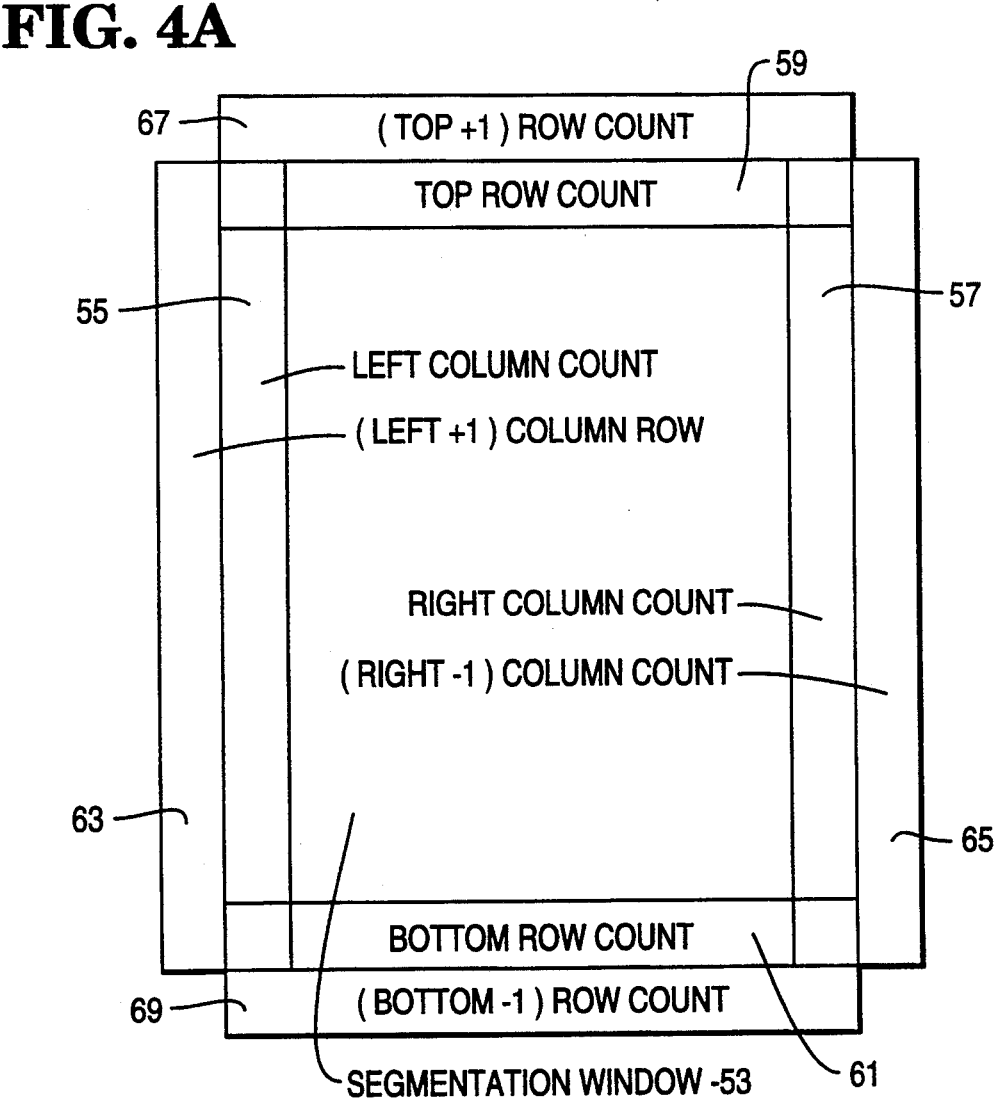
FIG. 4A is a graphic illustration of a window usable for framing a non-bar-coded character.

The system, under control of the stored program, examines the stored data values, and proceeds to locate a first character, then successive characters of a first field, then other characters of successive fields. Upon locating a character, the system proceeds to frame or delimit the character (i.e., to separate-out or segment the character from other characters). Starting with the stored gray-scale data values obtained from scanning the document from bottom-to-top along the right-most scan line 39 (FIGS. 1 and 2), and then from bottom-to-top along the next-right-most scan line 41, and so on, the system locates and frames (segments) each of the characters as described below. It does this by first searching the stored data for a rise in gray-scale value representing a transition from a light pixel to a dark pixel vertically from bottom to top along the scan line. If a rise of more than, for example, forty (the particular value, such as forty, being font dependent) is found between two grey-scale values of adjacent pixels in the scan direction 37, a dark pixel is deemed to be found. The region (of the document) proximate to the dark pixel is regarded as a region where a character is likely to be found. When a dark pixel is found, the system checks the character region (i.e., checks the stored data proximate to the dark pixel value) to determine if the dark pixel is part of a character. It checks for the presence of a character by establishing a segmentation window of sufficient size to effectively frame the character on the document, the position of the dark pixel corresponding to the center of the window. As depicted in FIG. 4A, a segmentation window 53 is shown having left and right edges (columns) 55,57, and top and bottom edges (rows) 59,61. Bordering the left and right edges are columns(-left+1) 63 and (right−1) 65, and bordering the top and bottom edges are rows (top+1) 67 and (bottom−1) 69.

Figure 5:
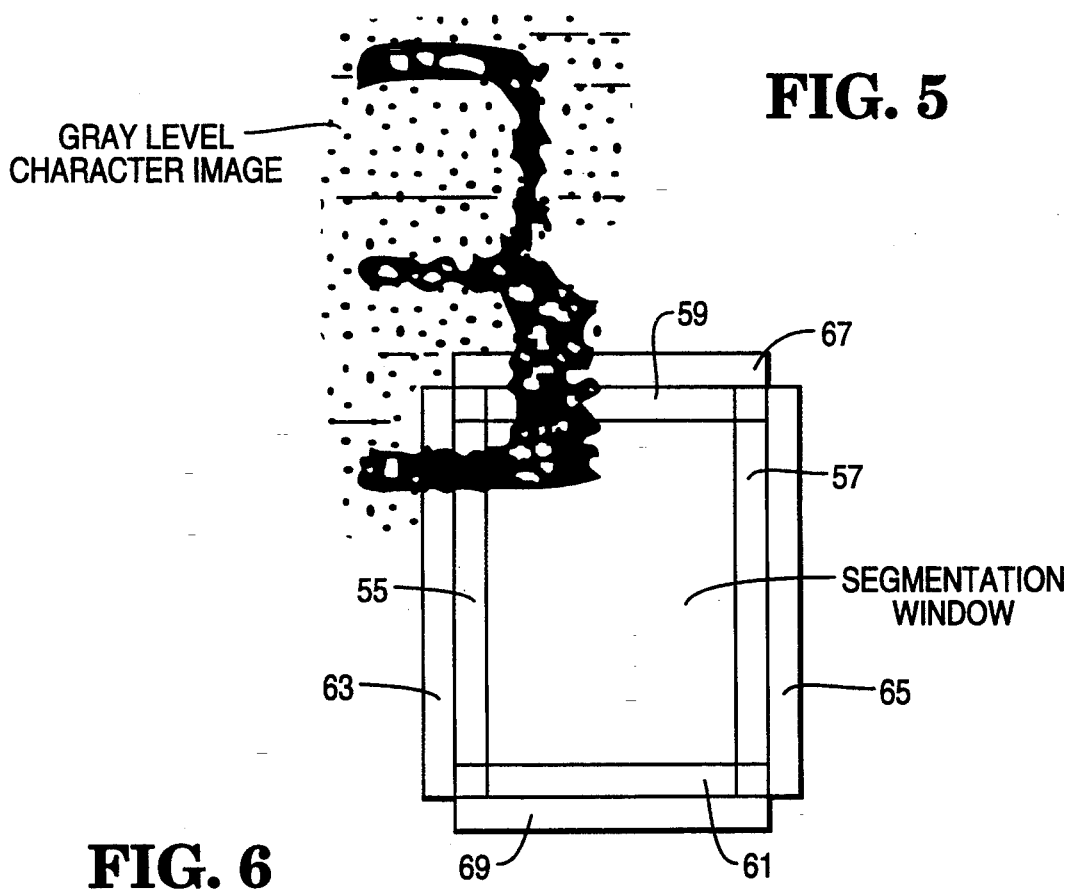
FIG. 5 is a graphic illustration of the window of FIG. 4A used in framing a non-bar-coded character.

As explained below with reference to FIGS. 4A and 5, a character is considered framed and positioned in the center of the window when the sum ($S_w$) of all the gray-scale pixel values in the window is maximum. To determine whether the sum ($S_w$) increases when the window is moved, the sums of the pixel values in each of the left and right columns 55,57 and in each of their bordering columns 63,65 are calculated. Likewise, the sums of the pixel values in each of the top and bottom columns 59,61 and in each of their bordering columns 67,69 are calculated. If, for example, the sum in column 63 is found to be greater than the sum in column 57, and would cause the sum ($S_w$) in the window to increase when the window 53 is moved by one pixel leftward to include column 63 and exclude column 57, then the window is moved leftward. Likewise, if by moving the window by one pixel upward to include row 67 and exclude row 61, the sum ($S_w$) in the window would increase, then the window is moved upward. Thus, from the sum (cumulative count) of the pixel values of the respective rows and columns adjoining (bordering) the window, relative to the sum of the pixel values of the respective rows and columns at the edges of the window, the direction can be determined in which the window can be moved to increase the sum ($S_w$) of the pixel values within the window. As shown in FIG. 5, according to the following counts:

Right−1 column count=0
Right column count=0
Left column count=100
Left+1 column count=100
Bottom−1 row count=0
Bottom row count=0
Top row count=170
Top+1 row count=170 the window count is increased by 100 upon a move leftward, and increased by 170 upon a move upward. Therefore, the window is moved leftward and upward. Thus, the window is moved in the direction which increases $S_w$, and this operation is repeated until no movement of the window in any of the four directions (left, right, up, down) increases $S_w$. The window is then considered to have framed (delimited/segmented) a character, with the character positioned at the center of the window. Thus, by means of the window a matrix of pixel values most representative of the character is selected (framed).

As a check to determine if there is enough information (dark-pixel grey-scale values) in the window to represent the framed character, the total number of pixels in the window that exceeds a predetermined confirmation threshold (e.g., a threshold gray-scale value of 100) is obtained. If the total number is greater than, for example, sixty (for a font such as the E13B font), then a character is confirmed to be found in the window. Otherwise, the object framed in the window is interpreted as noise, and the system proceeds to find the next character.

After segmentation, the segmented (framed) character is scaled in preparation for identification (recognition). Sixteen bit words are used in the recognition process (i.e., width of template is 16 pixels). Because many characters are wider than 16 pixels (including E13B characters which are 19 pixels wide), they are converted to 16 bits after segmentation. This is accomplished by eliminating predetermined columns e.g., for the E13B font, columns 4, 9 & 14 are eliminated. (OCRA and OCRB fonts are 16 pixels wide, at two hundred pixels per inch, and do not need to have columns eliminated.)

The preceding describes how a character is located in preparation for processing, i.e., how it is effectively located on a document and framed (segmented) for later processing. The following describes one way how the framed character is converted to binary form then matched to a template (predetermined binary pattern) for the purpose of identifying (classifying/recognizing) the character.

In the conversion operation, the stored grey-scale pixel values for each row of the framed character are converted to binary form. First a reference threshold value is calculated as the arithmetic mean of the dark pixels of the framed character (as previously described). Then, the grey-scale pixel values are converted to binary form relative to the reference threshold. For example, if the calculated reference threshold is one hundred, then, using the binary equivalence scale shown below:

| Grey-Scale Pixel Values | Binary Equivalent |
| --- | --- |
| $\geq 100$ | 1 (black) |

Figure 6:
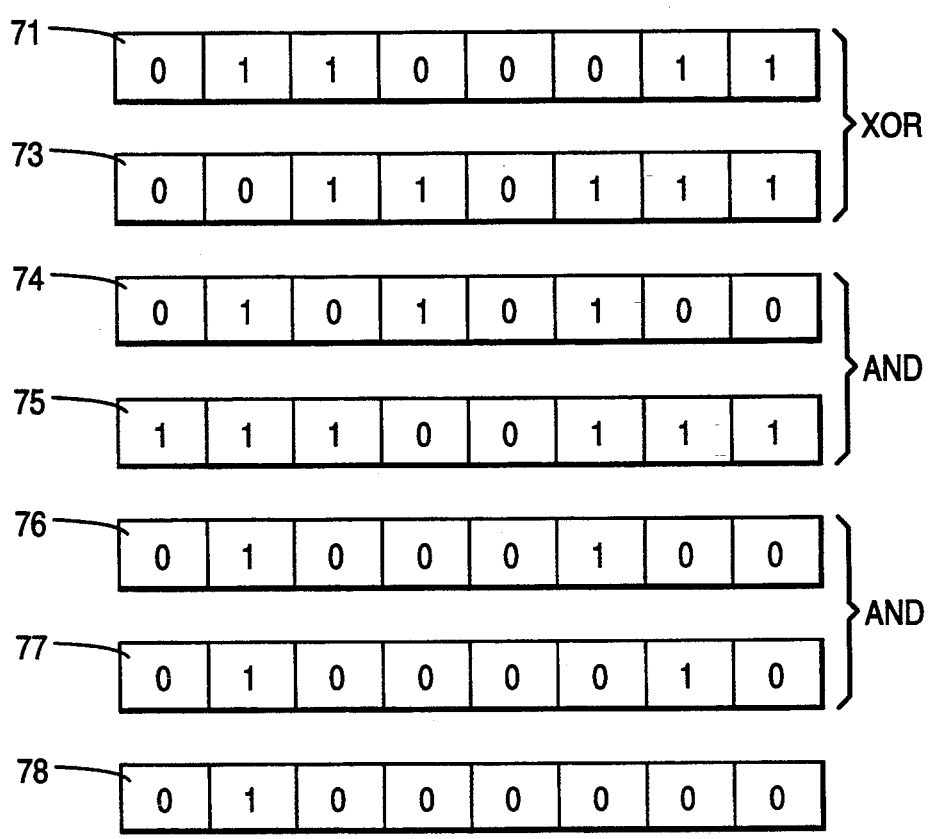
FIG. 6 is a block diagram showing the results of various logical operations performed on binary data representing the scanned/framed character.

| Grey-Scale Pixel Values | Binary Equivalent |
|---|---|
| <100 | 0 (white) | a row of grey scale values of 80, 120, 130, 90, 85, 70, 110, 135 may be converted to binary data having the bit pattern 01100011, as shown in the eight-bit word 71 of FIG. 6.

This binary data (which represents a row or slice of the framed character) and other rows of converted binary data representing the character are then compared to a plurality of templates, each template corresponding to a character. Each template represents a predetermined pattern of binary data and comprises three distinct layers (bit configurations). The three eight- bit words 73, 75, 77 shown in FIG. 6 represent an eight-bit row in each of the three layers. The first layer (bit-pattern layer, corresponding to pattern word 73) represents the actual black/white (0/1) bit pattern of the character. The second layer (bit-significance layer, corresponding to bit-significance word 75) identifies the bit positions of the character that are significant and those that are not significant. One-bits identify significant bit positions where the bit pattern of the character is expected to remain unchanged regardless of small changes in size and shape of the character. Zero-bits identify non-significant bit positions where the bit pattern need not be the same for different sizes or shapes of the character. The third layer (bit-weight layer, corresponding to weight word 77) identifies which bits are critical, and hence have greater weight than others, in distinguishing between like (substantially similar) characters. In this third layer, 1-bits are designated as weighted bits, and 0-bits are designated as non-weighted bits. For example, 1-bits in the top row of the third layer of the template for the characters "O" and "U" would be useful in distinguishing between the two characters, and 1-bits in the bottom row of the third layer of the templates for the characters "Q" and "O" would be useful in distinguishing between the Q and the O.

As shown in FIG. 6, various logic operations are performed by processor 23 (FIG. 1) on the binary data 71 in order to identify the character. (The logic operations are actually performed as sixteen-bit operations. However, for simplicity, eight-bit operations are shown.) First, the binary data is EXCLUSIVE-OR'd with the corresponding word 73 of the bit-pattern layer to produce a pattern of mismatch 74 between the binary data 71 and the predetermined correct pattern 73. This mismatch pattern 74 is then logically ANDed with the corresponding word 75 of the bit-significance layer for producing a mismatch word 76, representing the extent of mismatch independent of character size and shape. The mismatch word 76 is then weighted, i.e., logically ANDed with the corresponding word 77 in the bit-weight layer to produce a weighted mismatched indicator 78. (If weighting word 77 contained no 1-bits, no weighting or ANDing would have been performed (in order to save processing time since the outcome would be zero), and the system would have proceeded with processing the next row of binary data.)

Following the weighting operation, a mismatch count ($MC_R$) is calculated for the row of binary data 71. This calculation is performed by processor 23 (FIG. 1) as follows:

$$MC_R = MC_W + (WOC \times WF)$$

(1) where,
$MC_W$ represents a mismatch count for the mismatch word (i.e., the number of ones found in mismatch word 76),
WOC represents a mismatch indicator or weight out-put count (i.e., the number of ones found in mismatch indicator word 78), and
WF represents a predetermined weighting factor (e.g., the integer 2) for E13B type characters.

Thus, for the mismatch bit pattern shown in the words 76 and 78 in FIG. 6, it can be seen that $MC_W=2$, WOC=1, and WF=2. Therefore, the mismatch count ($MC_R$) calculated for the row of binary data 71 would equal four (i.e., 2+(1×2) according to equation 1 above).

After calculating the mismatch count for one row, the system proceeds to calculate, as indicated above, the mismatch count for all remaining rows of the character. The mismatch counts for all the rows of the character are then summed to produce a template mismatch count (i.e., a mismatch count for the template as applied to the framed character). In a similar manner, for the other templates of the character set for the font being processed, a mismatch count is produced for each template relative to the framed character. The two lowest template mismatch counts and their associated template numbers are stored in memory as the various templates are processed. The criterion for identifying a character is: if the template with the lowest count is below a threshold (a reject threshold of 40 for E13B fonts) and is lower than the next lowest template by a predetermined amount (a difference threshold of 5 for E13B fonts), it identifies the character.

Figure 7:
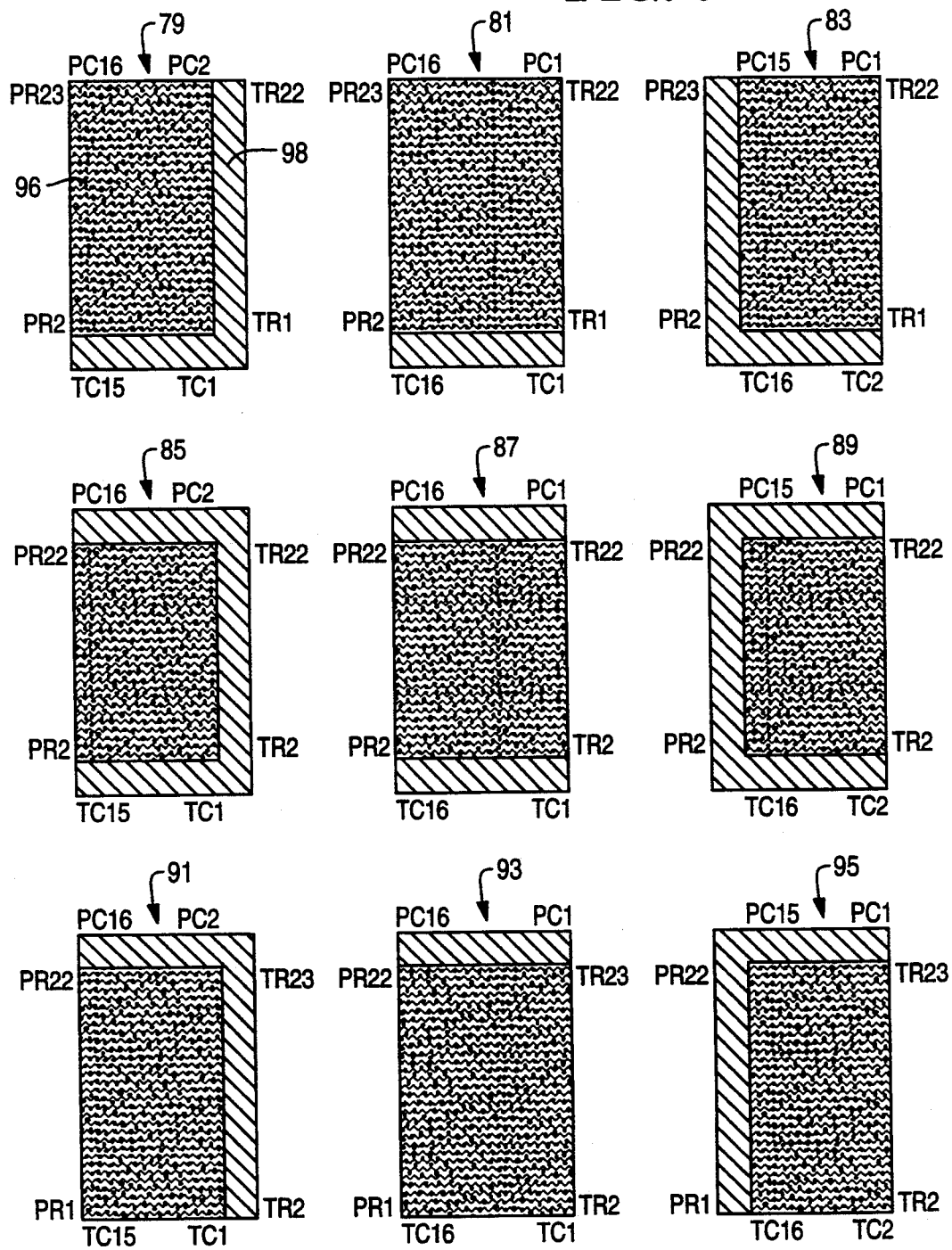
FIG. 7 is a block diagram of a matrix representing various portions of the image of a framed character.

Template recognition, as described previously, can be performed in a total of nine positions as shown in FIG. 7. This is done in order to identify characters that may be not be perfectly framed due to factors like noise in the image. In the example shown in FIG. 7, the template and input (binary data) pattern sizes are 23 rows (high) by 16 columns (wide). The three layers of the template (pattern layer, bit significance layer and weighing layer) are all shifted (moved) the same amount and in the same direction. In the description of shift positions presented below, template row refers to the bit pattern row, bit significance row and bit weight row.

In the center position 87, the template 96 is placed directly over the input pattern 98. Only rows 2 through 22 are used in this match. Thus, template row 1 is compared to pattern row 1, template row two is compared to pattern row 2 and so on. All columns (1 through 16) are used in the center horizontal positions 81, 87, 93. In the upper center position 81, rows 1 through 22 of the template are compared to rows 2 through 23 of the input pattern. This is the same as shifting the template pattern vertically upwards by one row. In this case, template row 1 is compared to input pattern row 2, template row 2 is compared to input pattern row 3, etc. All columns of the template and input pattern are compared in this situation (the horizontal center). Similarly, in the lower center position 93, the template is shifted down by one row, thus matching template rows 2 through 23 against input pattern rows 1 through 22.

The horizontal shift positions correspond to a shifting of the template 96 to the left or right over the input pattern 98. In the center left position 85, template columns 1 through 15 are used and input pattern columns 2 through 16 are used. (Since it is a center position vertically, rows 2 through 22 are used for both the input pattern and the template.) Thus, template word bit 1 is compared to pattern word bit 2, template word bit 3 is compared to pattern word bit 4, and so on.

For example, if the template pattern layer word is:

0011111100001111 and the input character pattern word is:

0010111100011110

The template is shifted left 1 bit (column):

0011111100001111 and the result of the exclusive Or operation would be:

0101000100000000

It should be noted that when a shift left operation is performed, the rightmost bit (least significant bit, LSB) is 0. Thus, the LSB of the bit-significant word will be 0 also (since all three layers are shifted in the same direction and amount), and, as such, the LSB of the mismatch word 76 (after the AND operation with the bit-significant word) will always be 0. Similarly, a shift to the right makes the leftmost bit (most significant bit, MSB) a 0 and, as such, the MSB of the mismatch word 76 (after the AND operation) will always be 0.

A horizontal shift to the right (position 89) is similar to the left shift, only in the opposite direction. Thus, bit 2 of the template word would line up (be compared to) bit 1 of the input pattern word.

The corner positions (positions 95, 91, 83, 79) represent a combination of a vertical shift of one row and a horizontal shift of one column. As an example, in the upper left position 79, the template row 1 is shifted left by one bit position and compared to pattern word 2, and template row 2 is shifted left by one bit position and compared to pattern word 3, and so on.

To recognize a character using this method requires nine passes per template times the number of templates in the character set. For example, an alphanumeric character set with 49 characters would require a total of 441 (9*49) matches being done. This can be too time consuming. To promote faster character identification, only the center position of each template is compared initially to the input pattern. The lowest two mismatch counts and their corresponding template numbers are stored in memory 27 as the various templates are processed. At the end of this first pass, the other eight positions of only these two templates are processed to find the best possible (i.e., lowest) total mismatch against the input pattern. Thus, only 65 (1*49+2*8) matches need to be made ordinarily (i.e., about 15% of the 441 matches that were required).

A description of the criteria for accepting or rejecting a character is presented below.

The lowest template mismatch count is compared to a predetermined reject threshold for the character that the template represents. If the template mismatch count for this character is below this threshold and the difference in template mismatch counts for the lowest two templates (second lowest mismatch minus lowest mismatch) is greater than a predetermined amount (e.g., 10), the template with the lowest template mismatch identifies the framed character. The reason for checking if the mismatch counts are too close is done to discriminate between characters that are very much alike (e.g., Q and O). If the mismatches are similar, the character is rejected rather than risking a misidentification (misread). If no template mismatch falls below the reject threshold discussed above or the two template mismatch counts are too close together, a post processing operation (described below) is performed. If after the post-processing operation the framed character is still rejected, its image is enhanced and converted to binary form (as described below). The recognition process (described above) is then performed again. If the character is identified (satisfies the above criteria), the system then proceeds to process (locate and frame) the next character as described above.

By examining the center positions only, the possibility may be missed that a character, other than the closest two, may have a closer count in a position other than the center and be the correct choice. The post processing operation can remedy such a situation. If the lowest two characters chosen are both over the predetermined reject threshold for that individual character or the inter-character distance (second lowest mismatch-lowest mismatch) is too small, a number of other templates may be tested in the other eight positions in an attempt to find a better match. The choice of which templates to process is made, for example, based on the closest character's similarity to the templates. For example, the closest two characters (those with the lowest mismatch counts) chosen, the letters D and O, both have mismatch counts above their individual reject threshold. In post processing operation, a predetermined set of characters that are similar to D and O would then be processed. This could include characters O (zero), Q, C and U. The mismatch counts of the closest two characters after this operation are checked (the one with the lowest mismatch count is checked first) to see if they meet the reject criterion and intercharacter distance criterion. If at least one character meets the criteria, that character is returned as the result, and processing (locating and framing) of the next character in the image proceeds.

If neither of the above characters meets the reject criteria, or the inter-character distance is too small, the framed character is rejected. In this case, its image is enhanced, (as described below), the character is re-binarized, and the recognition process described above is repeated a second time. If the character is recognized, it is returned. Otherwise, a reject character code is returned as the result, and processing (locating and framing) of the next character on the document continues.

In addition to the reject threshold described above, an exit threshold (e.g., the value 10) may also be used in the character identification process as described below. To enhance processing speed, successive template mismatch counts are compared to the exit threshold value, and the first template with a template mismatch count that falls below the exit threshold value would identify the character. In which event, the remaining templates are not processed (which enhances processing speed).

Further, to speed the character identification process, if, while the individual rows of a template are being processed, the mismatch count of the current template (i.e., the template currently being processed) is found to be larger than the second-lowest-count-obtained-thusfar, processing of the current template may be discontinued since this current template is no longer a contender to be one of the two with the lowest template mismatch counts. To further enhance recognition speed, the templates may be presequenced in the order in which they are most likely to occur (e.g., numbers before vowels followed by consonants in an alphanumeric font). If the mismatch is below the exit threshold (as mentioned above), the remainder of the templates need not be examined. Thus, those characters occurring most frequently should be examined first. Also, to promote faster character identification, only the center position may be tested by the templates, after which, if the lowest template mismatch count is above the exit threshold, the remaining eight positions for each of the two templates closest to the exit threshold may be processed, and the template with the lowest template mismatch count selected as representative of the character. Further, to speed identification, the remaining eight positions (FIG. 7) may be processed in the following sequence 79, 81, 83, 89, 91, 93, 95. This is the order in which the character is most likely to be positioned.

After identifying the framed character, the system proceeds to process the next character (i.e., to process the next group of stored pixel values representing the region on the document proximate to the framed character) by moving the segmentation window a selected number of pixels (e.g., three pixels) to the left of the previously framed character. The character in this proximate region is then framed (segmented) and identified as described above. All of the remaining characters (remaining stored pixel data) are processed in the manner until end-of-field is detected (i.e., no more characters have been located or an end-of-field character has been located).

If, during the character-identification process a character is rejected, its image is enhanced to facilitate identification. The image may be enhanced, for example, by producing a character image having constant stroke widths (i.e., having a constant number of dark pixels across the width of each vertical stroke or horizontal stroke of the character). This is accomplished as described below. First, the gray-scale pixel values (e.g., 6-bit, 8-bit, or 16-bit values) representing the character are converted to a lesser range of values (e.g., 3-bit gray-scale pixel values for faster processing), then the individual pixels of the character image are examined and only those pixels that are the darkest two or three pixels of the stroke are turned black, others are turned white. This produced a binary image with constant stroke widths as described for example in U.S. Pat. No. 4,625,330, incorporated by reference herein).

As an assist for improving character identification, the edges of each character may be processed as described below. As mentioned above, each template used in the character identification process corresponds to one character of the selected character set (e.g., the E13B character set) and, as shown in FIGS. 2 and 4, each character is fourteen pixels wide by twenty-one pixels high. One extra column is added to the left and to the right of the character, and one extra row is added to the top and to the bottom of the character. This results in a character size of 16 by 23. Corresponding to each character, each template is sixteen pixels wide by twenty-three pixels high. Each template has an extra column on each side (right side and left side) of the fourteen-column character, and one extra row on the top and an extra row on the bottom of the twenty-one-row character. Each extra row comprises sixteen white pixels, and each extra column comprises twenty-three white pixels. The extra rows and columns serve to surround the 14×21 character region with a border of white pixels for better identification of the edge portions of certain characters, as explained below. For example, if the character "E" is matched against a 14×21 "F" template, and the template is shifted upward one pixel position, the pixel values at the bottom of the "E" would be lost since it could not be used in generating the template mismatch count. This could result in mis-identification of the E as an F since the mismatch count would be low. With the 16×23 template, the bottom of the E would not be lost and would contribute substantially to the mismatch count against (relative to) the bottom white row of the F template, thereby avoiding mis-identification of the E as an F. A similar explanation holds with respect to the right and left column positions of the 16×23 template, the columns serve to reduce mis-identification between characters such as "B" and "3".

Figure 8:
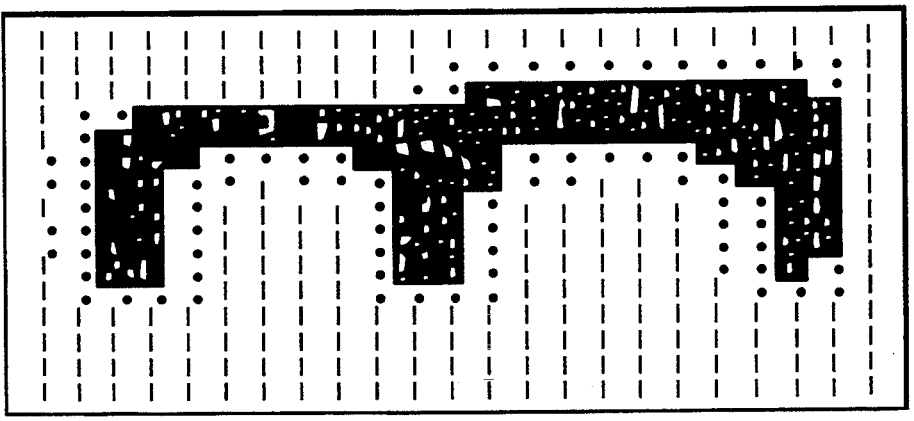
FIG. 8 is a graphic/tabular illustration of a template and associated binary values used by the system in representing a non-bar-coded character.

As shown in FIG. 8, each 16×23 template may be represented by sixty-nine sixteen-bit words of RAM 27 (corresponding to a scan of two hundred pixels per inch). Of the sixty-nine words, twenty-three represent first layer bit-pattern words, twenty-three represent second-layer bit-significance words, and twenty-three represent third-layer bit-weight words. Each set of twenty-three words corresponds to the height of the character, and each sixteen-bit word corresponds to the width of the character. (In FIG. 6, for simplicity, eight bits rather than sixteen bits are used to depict the logical operations.)

A listing of the pseudo code of the stored program which enables the system to perform the logical and other processing operations described above is presented below.

```
PSUEDO CODE

PROCEDURE:   MAIN
             Recognizes a codeline from a document image.
                while (NOT_END_OF_DOCUMENT)
                {
                    if (FIND_FIRST_CHARACTER finds
                       a character)
                    then
                            RECOGNIZE_FIELD
                    else
                            END_OF_DOCUMENT
                }
PROCEDURE:   FIND FIRST CHARACTER
             do
             {
             SCAN_IMAGE_FOR_WHITE_TO_BLACK_TRANSITION
             }
             until (FOUND_CHARACTER or END_OF_DOCUMENT)
PROCEDURE:   RECOGNIZE FIELD
             do
             {
                RECOGNIZE_CHARACTER
                move_to_next_position
             }
             while (FOUND_CHARACTER)
PROCEDURE:   RECOGNIZE CHARACTER
             BINARIZE_CHARACTER_IMAGE
             TEMPLATE_RECOGNITION_OF_CHARACTER
                if REJECTED then
                {
                ENHANCED_BINARIZE_CHARACTER_IMAGE
                TEMPLATE_RECOGNITION_OF_CHARACTER
                }
```

Processing of Bar-Coded Character Data

The template matching operations described above with respect to recognition of non-bar-coded character data are also applicable, with certain modifications (described below), to bar-coded character data.

As mentioned earlier, after the bar-coded characters on a document are scanned and grey-scale pixel values are produced and stored in memory 27, the stored pixel values for each character are segmented from the pixel values of the other characters. The character is segmented according to the bar-code segmentation method described in prior patent application Ser. No. 07/636,987 (incorporated by reference herein), producing an X-Y coordinate representing the bottom right edge of the character. This coordinate is then communicated to (i.e., passed from the segmentation routine to) the bar-code character recognition routine for processing. If the bar-code character recognition routine fails to adequately recognize the segmented bar-coded character, the template-matching character recognition routine is then called on to process the X-Y coordinate character data. (Alternatively, the X-Y coordinate data may be passed directly to the template matching character recognition routine, bypassing the bar-code recognition routine). When the template matching routine is called, the X-Y coordinate location of the bottom right hand corner of the character is passed to the routine. (The X coordinate represents a horizontal or column coordinate, and the Y coordinate represents a vertical or row coordinate of the character). The template matching routine then sets up a bar-code segmentation window using the X-Y coordinate. The template matching routine then attempts to locate the character more accurately, as described below. The segmentation window is constrained to locate the position of the character within plus-or-minus one CMC7 character width of the horizontal position (coordinate), and within plus-or-minus one half-character height of the vertical position (coordinate). (Failing this, the original X-Y position determined by the bar-code segmentation routine, is used for classification.) Before classification, the character's border is checked (before calling the template matching routine), as described below.

Figure 4B:
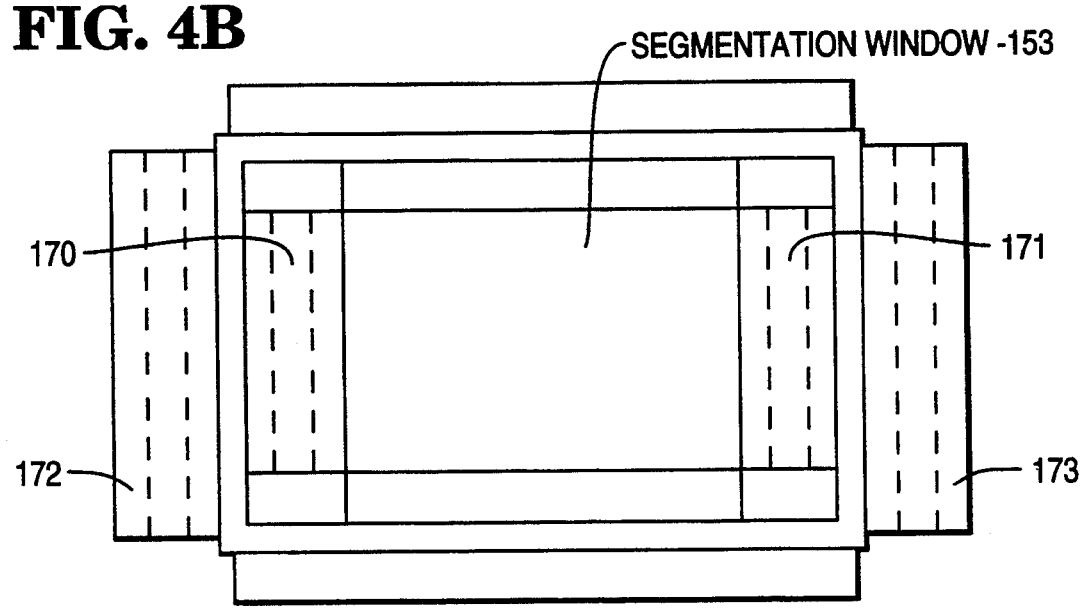
FIG. 4B is a graphic illustration of a window usable for framing a bar-coded character.

A CMC7 character is checked to determine if it has a clear border by determining the average of the pixel values in a 1-pixel border surrounding the character. If this average grey-scale pixel value exceeds the threshold value (thr) defined below, indicating a badly corrupted character, template matching is not performed. Otherwise, the template matching routine is called and template matching is performed using the threshold value (thr) defined as:

$$thr = 0.9*((BLACK+WHITE)/2)$$

where BLACK and WHITE are determined by pre-scanning the character. BLACK is the highest level pixel on the vertical bars, and WHITE is the lowest level pixel located between the vertical bars of the character. Bar-coded character data are segmented (framed) in substantially the same way as non-bar-coded character data (described above) except that, to determine the edge of a bar-coded character, three successive columns inside and outside the character are examined. Due to the nature of the bar coded characters, the use of single columns inside and outside the window (as is done for non-bar-coded characters) could fall on a white interval between bars, resulting in mis-segmentation of the character. As shown in FIG. 4B, to avoid such mis-segmentation, the sum of the pixels in the three columns 172 to the left of the window 153 (sum 172) is compared to the sum of the pixels in the three columns 171 on the inside right of the window (sum 171). If sum 172 > sum 171, a net gain could be realized by moving the window to the left. If the sum of the pixels in the three columns 173 to the right of the window exceeds the sum of the pixels in the three columns 170 on the left of the window, a net gain could be realized by moving the window to the right. In the case where both the above situations are true, the following is done:

if (sum 172 − sum 171) > (sum 173 − sum 172), the window is moved left
  if (sum 172 − sum 171) < (sum 173 − sum 172), the window is moved right.

Thus, the sum ($S_x$) of the grey scale pixel values assumes a maximum value. Because the bars are oriented vertically, single row sums above and below the character are adequate to determine the vertical movement of the window, the same as in the non-bar-code character case. When the character data is properly segmented in memory 27 (i.e., when the character is properly framed in window 153), the sum of all the grey-scale pixel values assumes a maximum value (Sw).

Each segmented character is represented as an array (21 pixels wide by 28 pixels high) of scanned data values, with the data along the vertical scan line 37 (FIG. 1) representing a waveform of grey-scale pixel values. In order to find the proper thresholding value to binarize the image within the window, the image is checked to find the blackest (closest to 255) pixel and the whitest (closest to 0) pixel. A binarization threshold is then set according to the following formula:

$$Threshold = blackest - (blackest - whitest)*\tfrac{2}{3}.$$

For example, if the whitest pixel had a value of 60, and the blackest pixel had a value of 200, the threshold would be placed at a level of:

$$Threshold = 200 - (200-60)*\tfrac{2}{3} \approx 107.$$

This threshold level is used in binarizing the segmented character data by setting all grey-scale pixel values of the segmented character data above the threshold to "1" (representing black), and setting all grey scale values below the threshold to "0" (representing white). This results in a 21 columns (21 pixels wide) by 28 rows (28 pixels high) array of binary (0,1) pixel values representing the segmented character.

In preparation for recognition of the character using the template matching procedure described above under "Processing of Non-Bar-Coded Character Data", the size of the binary array is reduced (compressed) to correspond to the size of the templates. For example, by starting at the bottom row of the array and omitting or deleting (skipping the accessing of) every other row of pixels, the array may be reduced (compressed) to a 14 rows by 21 columns array of pixels. Further, by rotating the compressed array 90° counterclockwise (i.e., by accessing the data values of the array as if the array was rotated), the array may be viewed as a 21×14 array, and actually as a 23×16 array when the white pixel border which typically borders each character (one pixel on each side and above and below the character) is included. With compression and rotation of the array, the size and orientation of the array are made to correspond to size and orientation of the templates, without loss of significant bar code (bar/interval) information.

Figure 9A:
FIGS. 9A-9C are graphic illustrations of a poorly printed bar-coded character, a corresponding binary pattern, and a corresponding template used by the system of FIG. 1 in representing a bar-coded character.
Figure 9B:
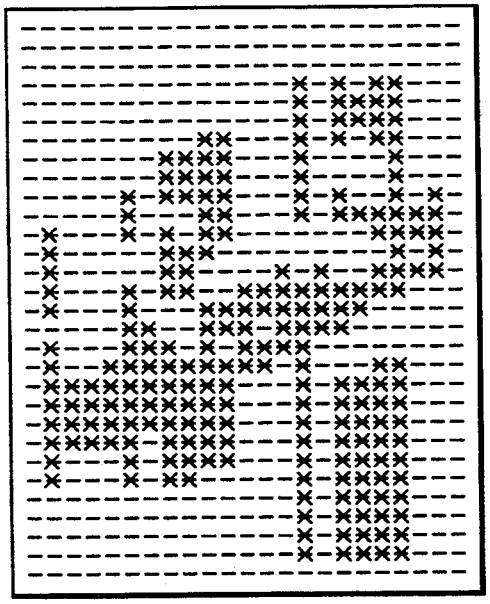
Figure 9C:
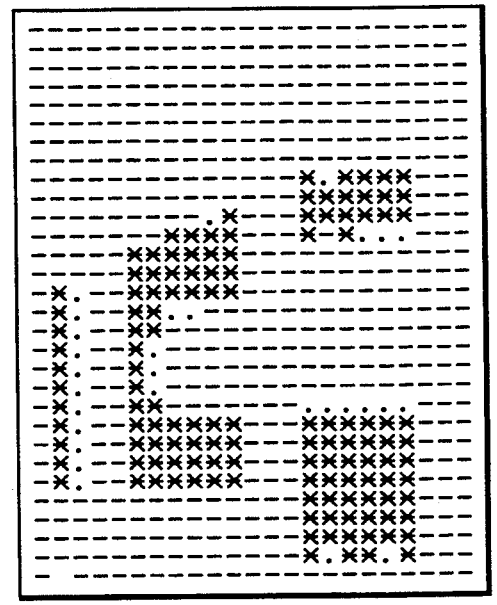

Templates of corresponding size (23×16) stored in memory 27 representing predefined bar-code character patterns are then used, as described above, to match the character's binary pattern to the template patterns for recognizing the character. An example of a character (the character "4") with defective bar-coded information is shown in FIG. 9A, and a corresponding binary pattern (with noise included representing the defect) is shown in FIG. 9B. An example of the bit pattern of a matching template used in recognizing the character "4" is shown in FIG. 9C. If the template matching routine fails to recognize the character, the threshold used to binarize the character is lowered to:

$$\text{Threshold} = \text{blackest} - (\text{blackest} - \text{whitest}) * \tfrac{1}{2}$$

As in the previous example, if the whitest pixel is found to have a value of 60, and the blackest pixel a value of 200, the threshold would be placed at a level of:

$$200 - (200 - 60) * \tfrac{1}{2} = 130.$$

The use of this threshold level has the effect of "dropping out" information (such as stamps, smudges, and pen marks, for example) that tends to obscure the CMC7 character when such information is less black (have a lower pixel value) than the bars of the CMC7 character.

Because the template matching system examines the shape or pattern of the overall character, it can recognize characters with missing bars or extra bars (such as pen strokes in signatures) that are not recognizable by a bar/interval (bar code) analysis system such as the system described in application Ser. No. 07/636,987. As such, when the template matching system of the present invention is used in conjunction with (or in lieu of) the bar/interval analysis system, the read rates (characters recognized/total characters attempted to recognize) are improved significantly.

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated.

What is claimed is:

1. Optical character recognition system comprising:
   means for optically scanning a bar-coded character having a predetermined pattern of bars and intervals of different opacities on a document, and producing a plurality of grey-scale values corresponding to said opacities, said grey-scale values representing a pattern of light and dark pixels;
   memory means disposed for storing the grey-scale values, said memory means including a stored program, and predetermined template data including a plurality of predetermined binary patterns, one of said predetermined binary patterns representing the character; and
   processing means including a processor in which processing is performed using a designated word size, and in which said processor is coupled to the scanning means and to the memory means, and operating under control of the stored program, for locating the character on the document by selecting from said grey-scale values a matrix, in rows and columns, of values representative of the character, for converting the matrix values to binary data, for compressing the binary data by eliminating predetermined said columns depending upon a font of the character to be recognized, and for selecting from the plurality of predetermined template binary patterns a pattern that matches the compressed binary data, said matching pattern serving to identify the character; and
   said predetermined template binary patterns including first, second, and third bit configurations;
   said processing means including:
   means for rotating 90 degrees the compressed binary data to facilitate processing using said designated word size in preparation for selecting a pattern that matches the compressed binary data; and
   logic means for:
   Exclusive Oring the compressed binary data with said first bit configuration to produce a first mismatch word;
   Anding said first mismatch word and said second bit configuration to produce a second mismatch word; and
   Anding said second mismatch word and said third bit configuration to produce a third mismatch word, with said third mismatch word being used to identify a character.

2. The system as in claim 1 wherein said character has a right, left, top and bottom edge, and said scanning means includes a means for reading from the bottom edge to the top edge in a vertical direction.

3. The system as in claim 2 wherein said processing means includes a means for framing a region having a plurality of pixels proximate to a dark pixel.

4. The system as in claim 3 wherein said framing means includes a means for defining a window for bordering said region.

5. The system as in claim 4 wherein said framing means includes a means for positioning the window so that a sum of grey-scale values within the window is a maximum, corresponding to the character being centrally located in the window, said maximum-sum values corresponding to a matrix of selected pixel values representative of the character.

6. The system as in claim 5 wherein said framing means includes means for identifying character edge and inter-character space utilizing at least three columns of character data.

7. The system as in claim 6 wherein said framing means also includes a means for confirming the presence of a framed character within the window, by determining the total number of pixels in the window that exceeds a predetermined confirmation threshold.

8. The system as in claim 7 wherein said processing means includes a means for calculating a threshold value for said selected pixel values.

9. The system as in claim 8 wherein said calculating means includes a means for producing binary data representative of the magnitudes of said selected pixel values relative to said threshold value.

10. Optical character recognition system comprising:
    means for optically scanning a bar-coded character having a predetermined pattern of bars and intervals of different opacities on a document, and producing a plurality of grey-scale values corresponding to said opacities, said grey-scale values representing a pattern of light and dark pixels;

memory means disposed for storing the grey-scale values, said memory means including a stored program, and predetermined template data including a plurality of predetermined binary patterns, one of said predetermined binary patterns representing the character;

processing means coupled to the scanning means and to the memory means, and operating under control of the stored program, for locating the character on the document by selecting from said grey-scale values a matrix of values representative of the character, for converting the matrix values to binary data, for compressing the binary data, and for selecting from the plurality of predetermined template binary patterns a pattern that matches the compressed binary data, said matching pattern serving to identify the character;

said character having a right, left, top and bottom edge, and said scanning means including a means for reading from the bottom edge to the top edge in a vertical direction;

said processing means including a means for framing a region having a plurality of pixels proximate to a dark pixel;

said framing means including:

a means for defining a window for bordering said region;

a means for positioning the window so that a sum of the grey-scale values within the window is a maximum, corresponding to the character being centrally located in the window, said maximum-sum values corresponding to a matrix of selected pixel values representative of the character;

means for identifying character edge and inter-character space utilizing at least three columns of character data; and a means for confirming the presence of a framed character within the window, by determining the total number of pixels in the window that exceeds a predetermined confirmation threshold;

said processing means including a means for calculating a threshold value for said selected pixel values;

said calculating means including a means for producing binary data representative of the magnitudes of said selected pixel values relative to said threshold value; and said predetermined template binary patterns including first, second, and third bit configurations;

said processing means including:

a means for rotating 90° counterclockwise the compressed binary data in preparation for selecting a pattern that matches the compressed binary data; and logic means for:

Exclusive Oring the compressed binary data with said first bit configuration to produce a first mismatch word;

Anding said first mismatch word and said second bit configuration to produce a second mismatch word; and Anding said second mismatch word and said third bit configuration to produce a third mismatch word, with said third mismatch word being used to identify a character.

11. Optical character recognition system comprising:

means for optically scanning a bar-coded character having a predetermined pattern of bars and intervals of different opacities on a document, and producing a plurality of grey-scale values corresponding to said opacities, said grey-scale values representing a pattern of light and dark pixels;

memory means disposed for storing the grey-scale values, said memory means including a stored program, and predetermined template data including a plurality of predetermined binary patterns, one of said predetermined binary patterns representing the character;

processing means coupled to the scanning means and to the memory means, and operating under control of the stored program, for locating the character on the document by selecting from said grey-scale values a matrix of values representative of the character, for converting the matrix values to binary data, for compressing the binary data, and for selecting from the plurality of predetermined template binary patterns a pattern that matches the compressed binary data, said matching pattern serving to identify the character;

said character having a right, left, top and bottom edge, and said scanning means including a means for reading from the bottom edge to the top edge in a vertical direction;

said processing means including a means for framing a region having a plurality of pixels proximate to a dark pixel;

said framing means including:

a means for defining a window for bordering said region;

a means for positioning the window so that a sum of the grey-scale values within the window is a maximum, corresponding to the character being centrally located in the window, said maximum-sum values corresponding to a matrix of selected pixel values representative of the character;

means for identifying character edge and inter-character space utilizing at least three columns of character data; and a means for confirming the presence of a framed character within the window, by determining the total number of pixels in the window that exceeds a predetermined confirmation threshold;

said processing means including a means for calculating a threshold value for said selected pixel values;

said calculating means including a means for producing binary data representative of the magnitudes of said selected pixel values relative to said threshold value; and said processing means also including:

a means for rotating 90° counterclockwise the compressed binary data in preparation for template matching;

a means for producing a mismatch count for each predetermined binary pattern, said count being indicative of the extent of mismatch between the predetermined binary pattern and the compressed binary data;

said means for producing a mismatch count including a means for selecting from mismatch counts the count that best satisfies at least one predetermined threshold criterion;

said means for producing a mismatch count including a means for producing mismatch words and calculating a count based on the contents of selected ones of said words, said words being indicative of the extent of mismatch between the compressed binary data and selected bit configurations of said predetermined binary pattern.

12. The system as in claim 11 wherein each predetermined binary pattern includes first, second, and third bit configurations, said first bit configuration representing an actual bit pattern of the character, and said means for producing a mismatch count includes a logic means for performing an exclusive-OR operation between the compressed binary data and the first bit configuration to produce a first mismatch word.

13. The system as in claim 12 wherein said second bit configuration represents predetermined significance of respective bits of the actual bit pattern, and said means for producing a mismatch count includes a logic means for performing an AND operation between the first mismatch word and the second bit configuration to produce a second mismatch word.

14. The system as in claim 13 wherein said third bit configuration represents weighted values of respective bits of the actual bit pattern, and said means for producing a mismatch count includes a logic means for performing an AND operation between the second mismatch word and the third bit configuration to produce a third mismatch word.

15. The system as in claim 14 wherein each of said predetermined binary patterns represents a predetermined template, and said framed character may be compared against a predetermined template in each of nine positions, a center position and eight non-center positions, and said means for producing a mismatch count includes a means for positioning a template relative to the center portion of the framed character.

16. The system as in claim 15 wherein said means for positioning places the predetermined binary pattern relative to one of the non-center portions of the framed character.

17. The system as in claim 16 wherein said grey-scale values are in the range 0 to 255.

18. The system as in claim 17 wherein said character is a member of a selected character set.

19. The system as in claim 18 wherein said character and said window are each of a predetermined size for a selected font.

20. The system as in claim 19 wherein each bit-configuration of said predetermined binary pattern is a first predetermined number of pixels wide by a second predetermined number of pixels high.

21. A method of optically identifying a bar-coded character on a document, the character having a predetermined height and width and a predetermined pattern of bars and intervals of different opacities, the character being represented by one of a plurality of predetermined template binary patterns, the method comprising the steps of:

optically scanning the document and producing a plurality of grey-scale values corresponding to said opacities, said grey-scale values representing light and dark pixels;

locating the character by selecting, from said grey-scale values, a matrix of values representative of the character:

converting the matrix values to binary data;

compressing the binary data; and selecting from the plurality of predetermined template binary patterns a pattern that matches the compressed binary data, said matching pattern serving to identify the character;

said step of optically scanning the document including the step of reading each character on the document by scanning from bottom to top in a vertical direction;

said step of locating the character including the step of framing a region having a plurality of pixels proximate to a dark pixel;

said step of framing including:

the step of defining a window for bordering said region;

the step of framing a character by positioning the window so that the sum of the grey-scale values within the window is a maximum, corresponding to the character being centrally located in the window, said maximum-sum values corresponding to a matrix of selected pixel values representative of the character;

the step of identifying character edge and inter-character space utilizing at least three columns of character data; and the step of confirming the presence of a framed character within the window, by determining the total number of pixels in the window that exceeds a predetermined confirmation threshold;

said step of converting including the step of calculating a threshold value from the values represented by the dark pixels of the framed character;

said step of converting also including the step of producing binary data representative of the magnitudes of said selected pixel values relative to said threshold value; and said step of compressing the binary data including the step of rotating 90° counterclockwise the compressed binary data in preparation for template matching:

said step of selecting a predetermined template binary pattern that matches the compressed data including a step of producing a mismatch count for each predetermined binary pattern, said count being indicative of the extent of mismatch between the predetermined template binary pattern and the compressed binary data;

said step of selecting a predetermined template binary pattern also including the step of selecting from the mismatch counts that count that best satisfies at least one predetermined threshold criterion; and said step of producing a mismatch count including the steps of producing mismatch words and calculating a count based on the contents of selected ones of said mismatch words, said mismatch words being indicative of the extent of mismatch between the compressed binary data and selected bit configurations of said predetermined template binary pattern.

22. The method of claim 21 where each predetermined binary pattern includes first, second, and third bit configurations, said first bit configuration representing an actual bit pattern of the character, and the step of producing a mismatch count includes the step of performing an exclusive-OR logical operation between the converted binary data and the first bit configuration for producing a first mismatch word.

23. The method of claim 22 where said second bit configuration represents predetermined significance of respective bits of the actual bit pattern, and the step of producing a mismatch count includes the step of performing an AND logical operation between the first mismatch word and the second bit configuration for producing a second mismatch word.

24. The method of claim 23 where said third bit configuration represents weight values of respective bits of the actual bit pattern, and the step of producing a mismatch count further includes the step of performing AND logical operation between the second mismatch word and the third bit configuration for producing a third mismatch word.

25. The method of claim 24 where the framed character may be divided virtually into nine portions, a center portion and eight non-center portions, and the step of producing a mismatch count includes the step of positioning a predetermined template binary pattern relative to the center portion of the framed character.

26. The method of claim 25 where the step of positioning includes placing the predetermined template binary pattern relative to one of the eight non-center portions of the framed character.

* * * * *